United States Patent Office 3,364,204
Patented Jan. 16, 1968

3,364,204
SYNTHESIS OF HALOGENATED STEROIDS
OF THE PREGNENE SERIES
Patrick A. Diassi, Westfield, and Josef Fried, Princeton,
N.J., assignors, by mesne assignments, to E. R. Squibb &
Sons, Inc., New York, N.Y., a corporation of Delaware
No Drawing. Filed Feb. 9, 1960, Ser. No. 7,521
5 Claims. (Cl. 260—239.55)

This invention relates to and has for its object the provision of new steroids useful both as intermediates in the preparation of other physiologically active steroids and for their own physiological activity; new intermediates useful in preparing such steroids; and methods for preparing said steroids and converting the same to known physiologically active steroidal substances.

The steroids of this invention, having dual utility as intermediates and as physiologically active final products, have the general formula:

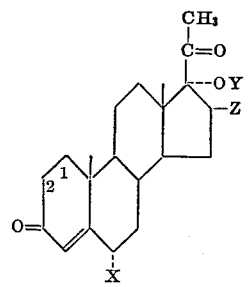

wherein the 1,2 - position is saturated or double-bonded; Y is hydrogen or the acyl group of a hydrocarbon carboxylic acid of less than ten carbon atoms; Z is iodo, bromo or chloro; and X is chloro or fluoro. Those steroids of the above formula wherein Y is the acyl group of a hydrocarbon carboxylic acid of less than ten carbon atoms, are physiologically active substances which possess progestational activity and thus may be used instead of known progestational agents, such as progesterone, in the treatment of such conditions as habitual or threatened abortion, for which purpose they are administered parenterally in the same manner as progesterone.

The compounds of this invention can be prepared by three different processes which can be represented schematically by the following equations:

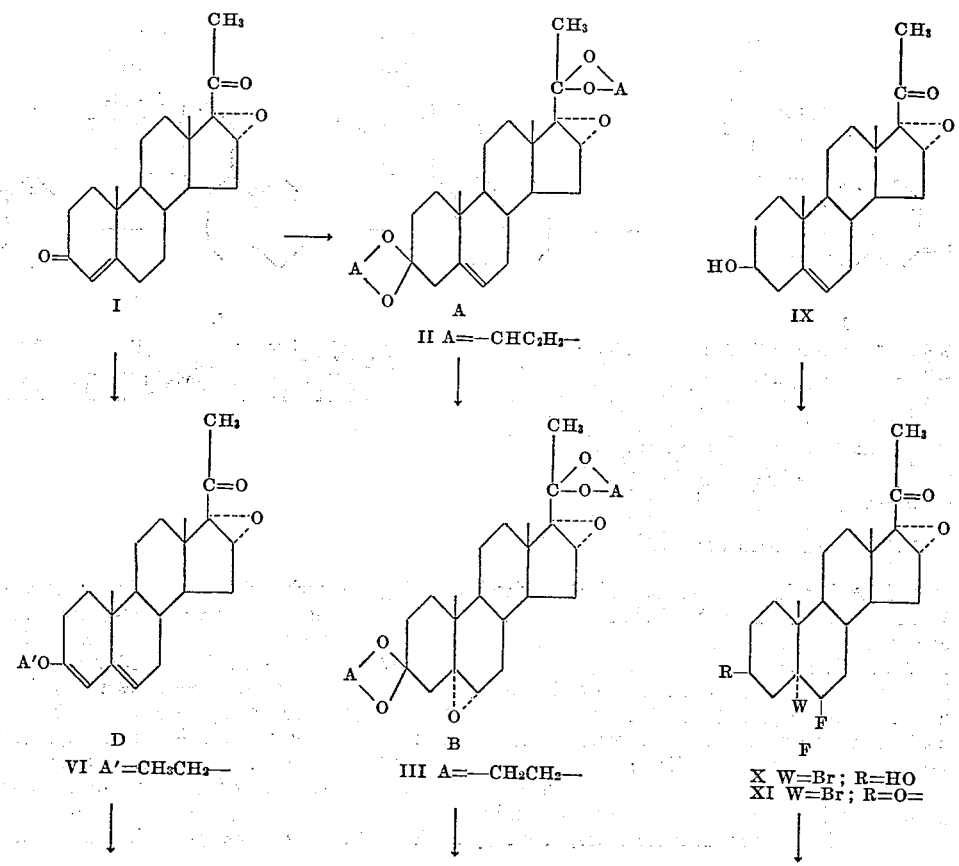

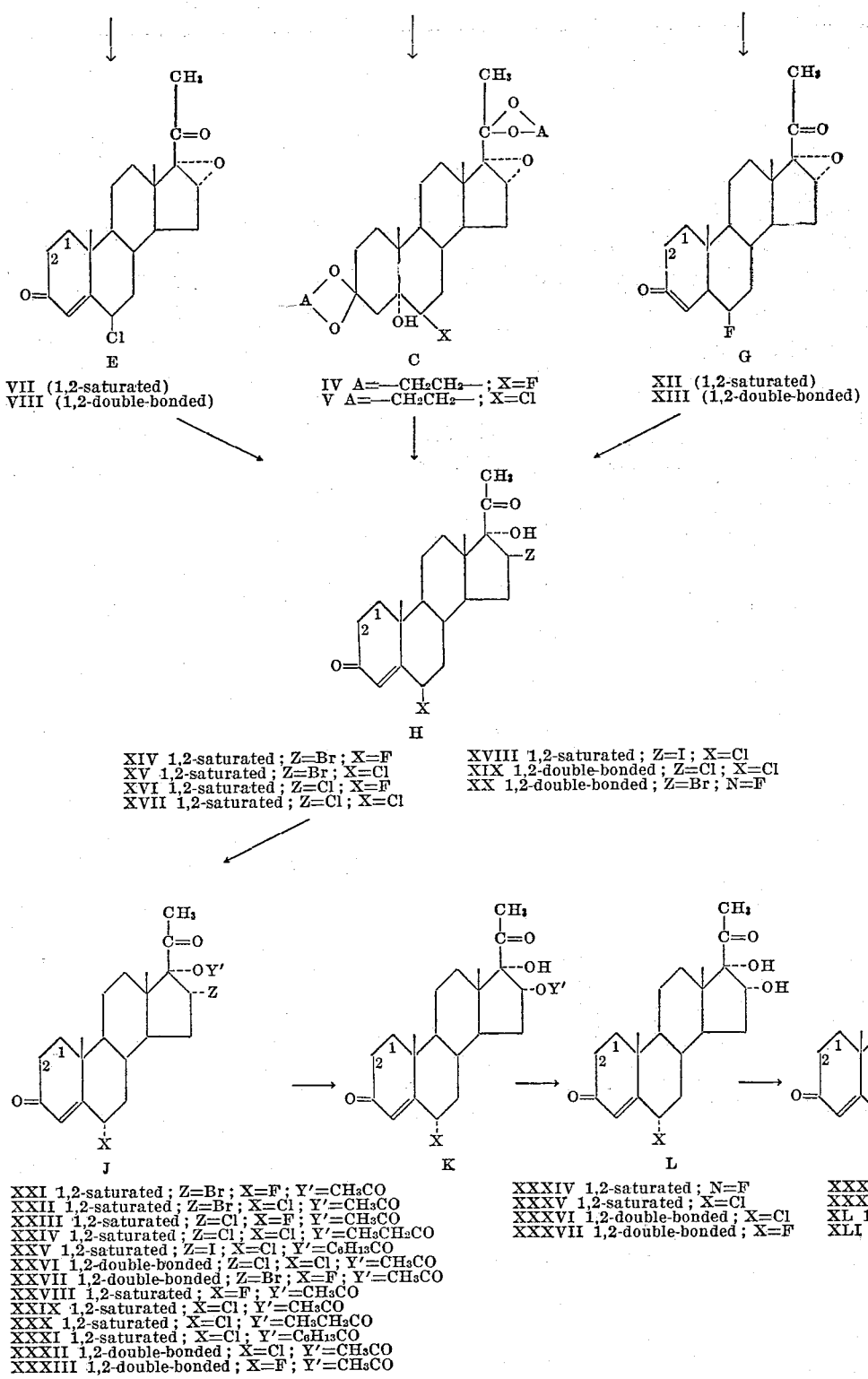

wherein A is a lower alkylene radical, preferably having 1 to 3 carbon atoms in the chain as exemplified by ethylene, propylene-1,3 and propylene-1,2; X is chloro or fluoro; A' is lower alkyl, preferably methyl or ethyl; W is iodo, bromo or chloro; Z is iodo, bromo or chloro; and Y' is the acyl radical of a hydrocarbon carboxylic acid of less than ten carbon atoms. In all instances Y' (and Y when an acyl radical) are preferably the acyl radical of such hydrocarbon carboxylic acids as the lower alkanoic acids (e.g., acetic, propionic, n-butyric and enanthic acid), lower alkenoic acids, lower cycloalkane carboxylic acids, lower cycloalkene carboxylic acids, monocyclic aryl carboxylic acids (e.g., benzoic acid), and monocyclic aralkanoic acids (e.g., phenylacetic acid).

In accordance with one method of this invention, 16α, 17α-epoxyprogesterone (I) is diketalized in the 3,20-positions by treatment with a ketalizing agent, such as a lower alkanediol (e.g., ethylene glycol and propylene glycol) in an acidic medium, thereby forming the 3,20-diketals of this invention (Compounds A). The diketal is then epoxidized in the 5,6-position by treatment with an organic peracid, such as perphthalic, perbenzoic and peracetic acid, to yield the 5α,6α; 16α,17α-diepoxides of this invention (Compounds B).

Compounds B are then treated with either boron trifluoride or boron trichloride to selectively open the epoxy group in the 5,6-position thereby yielding the 5α-hydroxy-6β-halo derivatives (Compounds C) wherein the halogen corresponds to the halogen of the boron trihalide reactant.

Compounds C are then treated with a hydrohalic acid, such as hydrochloric acid, hydrobromic acid and hydroiodic acid, in an organic solvent containing water whereby the 16α,17α-epoxy ring is opened to yield a 16β-halo-17α-hydroxy derivative, wherein the 16-halo group corresponds to the halogen of the hydrohalic acid reactant. Simultaneously, the ketal groups are hydrolyzed off, the steroid is dehydrated thereby introducing a double-bond in the 4,5-position, and the 6β-halo group is inverted, thereby yielding Compounds H, wherein the 1,2-position is saturated.

If a 1,2-unsaturated steroid is desired as the final product, Compounds H, saturated in the 1,2-position, can be microbially dehydrogenated in this position by treatment with a microorganism, such as Bacterium cyclo-oxydans in accordance with the method disclosed in U.S. Patent No. 2,822,318.

Alternatively, compounds of the Formula H may be prepared by converting 16α,17α-epoxyprogesterone (I) to its enol ether (Compounds D) by treatment with a lower alkyl orthoformate (e.g., ethyl orthoformate) in the presence of an acid catalyst. Compounds D are then treated with a chlorinating agent such as an N-chloroamide or N-chloroimide of a hydrocarbon carboxylic acid (e.g., N-chlorsuccinimide and N-chloracetamide) to introduce a chloro radical in the 6β-position and reconvert the enol ether to its 3-keto-Δ⁴-derivative (Compounds E, wherein the 1,2-position is saturated). If a $\Delta^{1,4}$-pregnadiene is desired, the Δ⁴-pregnene is then 1,2-dehydrogenated microbiologically, as by the use of Bacterium cyclo-oxydans, as described hereinbefore.

Compounds E, upon treatment with a hydrohalic acid as described hereinbefore then yield the desired compounds of Formula H.

As a third alternative, compounds of the Formula H may be prepared by treating 16α,17α-epoxypregnenolone (IX) with a halogenating agent in the presence of hydrogen fluoride. Suitable halogenating agents include the N-iodo, N-bromo and N-chloro amides and imides of hydrocarbon carboxylic acids, such as N-iodoacetamide, N-bromacetamide, N-chloracetamide, N-bromosuccinimide and N-chlorosuccinimide. The process results in the introduction of two dissimilar halo radicals into the steroid nucleus. Into the 6β-position is introduced a fluoro radical, whereas in the 5α-position is introduced a halo radical, wherein the halo group corresponds to that of the halogenating agent, thereby yielding Compounds F, wherein R is hydroxy.

Compounds F, wherein R is hydroxy, are then oxidized by treatment with an oxidizing agent (e.g., chromic oxide) capable of converting a 3-hydroxyl group to a 3-keto group, thereby yielding compounds of the Formula F, wherein R is keto, which in turn are dehydrohalogenated by heating with a salt of a strong base and a weak acid (e.g., sodium acetate) to yield the corresponding 3-keto-Δ⁴-derivative (Compounds G, wherein the 1,2-position is saturated). If a 1,2-unsaturated derivative is desired, it is formed by microbiological 1,2-dehydrogenation as described hereinbefore.

Compounds G are then treated with a hydrohalic acid as described hereinbefore to yield compounds of the Formula H.

Compounds H are then converted to the physiologically active 17α-ester derivatives by treatment with an acid halide or acid anhydride, of a hydrocarbon carboxylic acid of less than ten carbon atoms, such as the acyl chlorides or acid anhydrides of the hydrocarbon carboxylic acids of less than ten carbon atoms enumerated hereinbefore, thereby yielding Compounds J.

Aside from their use as physiologically active steroids per se, Compounds J can be converted, by treatment in an acidic aqueous organic medium containing a salt of a strong base and weak acid (e.g., sodium acetate in aqueous acetic acid), to the corresponding 16α-acyloxy-17α-hydroxy derivative (Compounds K) wherein the acyl group is the same as that originally present in the 17-position.

Compounds K can then be hydrolyzed by treatment with a salt of a strong base and weak acid (e.g., sodium carbonate) in an alcoholic medium (e.g., methanol) to yield the free 16α,17α-dihydroxy derivative (Compounds L), which can then be ketalized in the 16,17-position as by treatment with acetone in an acid medium to yield the corresponding 16α,17α-acetonides (Compounds M). These acetonides are physiologically active substances which possess progestational activity and hence may be administered either perorally or parenterally for the treatment of such conditions as habitual or threatened abortion, being formulated for such administration in the usual perorally or parenterally acceptable preparation.

The following examples illustrate the invention (all temperatures being in centigrade). The first seven examples illustrate the first alternative method for preparing the compounds of this invention:

*Example 1.—16α,17α-epoxy-Δ⁵-pregnene-3,20-dione 3,20-bis-ethylene ketal (II)*

A solution of 5.0 g. of 16α,17α-epoxyprogesterone (I) in a mixture of 40 ml. of ethylene glycol and 175 ml. of benzene is refluxed for one hour using a Dean Stark separator for collecting the distilled water. To this solution is added 100 mg. of p-toluenesulfonic acid and the mixture is refluxed for four hours with stirring. The reaction mixture is cooled and extracted with saturated sodium bicarbonate. The organic phase is then washed well with water, dried over anhydrous sodium sulfate, filtered and concentrated to dryness in vacuum. Recrystallization of the residue from acetone hexane gives pure 16α,17α-epoxy-Δ⁵-pregnene-3,20-dione 3,20 - bis - ethylene ketal.

If propylene glycol is substituted for the ethylene glycol in Example 1, the corresponding 3,20-bis-propylene ketal is obtained as the product.

*Example 2.—5α,6α;16α,17α-diepoxypregnane-3,20-dione 3,20-bis-ethylene ketal (III)*

A solution of 150 mg. of 16α,17α-epoxy-Δ⁵-pregnene-3,20-dione 3,20-bis-ethylene ketal in 10 ml. of chloroform is cooled to 0° and 2.13 ml. of 0.37 N monoperphthalic acid in ether is added. The reaction is left at 0° for 16 hours and then poured into a cold mixture of chloroform and dilute sodium bicarbonate. The chloroform is separated, washed several times with water and evaporated to dryness. Fractional crystallization of the residue from acetone gives 5α,6α;16α,17α-diepoxypregnane-3,20-dione 3,20-bis-ethylene ketal.

Similarly, the 3,20-bis-propylene ketal of 16α,17α-epoxy-Δ⁵-pregnene-3,20-dione yields 5α,6α;16α,17α-diepoxypregnane-3,20-dione 3,20-bis-propylene ketal.

*Example 3.—6β-fluoro-16α,17α-epoxypregnane-5α-ol-3, 20-dione 3,20-bis-ethylene ketal (IV)*

To a solution of 3.0 g. of 5α,6α;16α,17α-diepoxypregnane-3,20-dione 3,20-bis-ethylene ketal in 500 ml. of dry benzene and 500 ml. of dry ether is added 12.5 ml. of freshly distilled boron trifluoride-etherate and the reaction mixture is left at room temperature for three hours. 900 ml. of water is added and the mixture is neutralized with dilute sodium bicarbonate. The organic phase is separated, washed several times with water, dried over anhydrous sodium sulfate, filtered and evaporated to dryness. Crystallization of the residue from methanol gives 6β-fluoro-16α,17α-epoxypregnane-5α-ol-3,20-dione 3,20-bis-ethylene ketal.

*Example 4.—6β-chloro-16α,17α-epoxypregnane-5α-ol-3, 20-dione 3,20-bis-ethylene ketal (V)*

Following the procedure of Example 3 but substituting 12.5 ml. of freshly distilled boron trichloride for the boron trifluoride-etherate, 6β-chloro-16α,17α-epoxypregnane-5α-ol-3,20-dione 3,20-bis-ethylene ketal is obtained.

*Example 5.—6α-fluoro-16β-bromo-Δ⁴-pregnene-17α-ol-3, 20-dione (XIV)*

To a solution of 100 mg. of 6β-fluoro-16α,17α-epoxypregnane-5α-ol-3,20-dione 3,20-bis-ethylene ketal in 1 ml. of acetic acid, 0.1 ml. of 33% hydrobromic acid in acetic acid is added and the reaction mixture is left at room temperature for two hours. It is then diluted with water, extracted with chloroform and the chloroform extract washed with dilute sodium bicarbonate and water. The chloroform is evaporated to dryness and the residue crystallized from acetone-hexane to give 6α-fluoro-16β-bromo-Δ⁴-pregnane-17α-ol-3,20-dione.

*Example 6.—6α-chloro-16β-bromo-Δ⁴-pregnene-17α-ol-3,20-dione (XV)*

Following the procedure of Example 5 but substituting 100 mg. of 6β-chloro-16α,17α-epoxypregnane-5α-ol-3,20-dione 3,20-bis-ethylene ketal for the 6β-fluoro-16α,17α-epoxypregnane - 5α-ol-3,20-dione 3,20-bis-ethylene ketal, 6α - chloro - 16β-bromo-Δ⁴-pregnene-17α-ol-3,20-dione is obtained.

*Example 7.—6α-fluoro-16β-chloro-Δ⁴-pregnene-17α-ol-3,20-dione (XVI)*

Following the procedure of Example 5 but substituting 0.1 ml. of concentrated aqueous hydrochloric acid for the hydrobromic acid in acetic acid, 6α-fluoro-16β-chloro-Δ⁴-pregnene-17α-ol-3,20-dione is obtained.

The following six examples illustrate the second alternative method for preparing the 6α-chloro-compounds of this invention:

*Example 8.—3-ethoxy-16α,17α-epoxy-Δ³,⁵-prenadiene-20-one (VI)*

To a solution of 2.27 g. of 16α,17α-epoxyprogesterone in 22.0 ml. of dioxane is added 0.22 ml. of absolute ethanol and 2.27 ml. of ethyl orthoformate. To this mixture is then added dropwise 1.59 ml. of a solution of 0.5 ml. of sulfuric acid in 10 ml. of dioxane. After 15 minutes at room temperature, the sulfuric acid is neutralized by addition of a drop of pyridine. Water is then added slowly with swirling whereupon the 3-ethoxy-16α,17α-epoxy-Δ³,⁵-pregnadiene-20-one crystallizes as long needles. These are filtered, washed with water containing a drop of pyridine and dried to give about 2.34 g. of product of the following properties: M.P. about 118–120°, $[\alpha]_D +14°$ (chloroform); $\lambda_{max}^{alc}$ 240 mμ ($\epsilon$=18,500); $\lambda_{max}^{Nujol}$ 5.86, 6.00, 6.06, 6.15μ

Analysis.—Calcd. for $C_{23}H_{32}O_3 \cdot \frac{1}{2} H_2O$ (365.49): C, 75.58; H, 9.10. Found: C, 75.89; H 8.82.

Similarly by substituting 2.2 ml. of methyl orthoformate for the ethyl orthoformate in Example 8, 3-methoxy-16α,17α-epoxy-Δ³,⁵-pregnadiene-20-one is produced.

*Example 9.—6β-chloro-16α,17α-epoxyprogesterone (VII)*

To a solution of 2.0 g. of 3-ethoxy-16α,17α-epoxy-Δ³,⁵-pregnadiene-20-one in 25 ml. of dioxane, is added dropwise a solution of 742.9 mg. of N-chlorosuccinimide in 20 ml. of dioxane, followed by 15 ml. of a sodium acetate-acetic acid buffer containing 6.6 g. of sodium acetate and 6.6 ml. of acetic acid per 100 ml. of water. After 30 minutes at room temperature, the reaction mixture is diluted with water whereupon crystalline 6β-chloro-16α,17α-epoxyprogesterone separates. It is filtered, washed with water and dried.

*Example 10.—6β-chloro-16α,17α-epoxy-Δ¹,⁴-pregnadiene-3,20-dione (VIII)*

6β - chloro - 16α,17α - epoxyprogesterone is dehydrogenated in the 1,2-position to 6β-chloro-16α,17α-epoxy-Δ¹,⁴-pregnadiene-3,20-dione by means of *Bacterium cyclooxydans* A.T.C.C. No. 12,673 using the method of Example 1 of U.S. Patent No. 2,822,318 and substituting 500 mg. of 6β-chloro-16α,17α-expoxyprogesterone for the 11α-hydroxyprogesterone of the example.

*Example 11.—6α,16β-dichloro-17α-hydroxyprogesterone (XVII)*

To a solution of 100 mg. of 6β-chloro-16α,17α-epoxyprogesterone in 1.0 ml. of acetic acid, 0.1 ml. of a solution of concentrated aqueous hydrogen chloride is added and the mixture is left at room temperature for two hours. The solution is then diluted with water and the crystals thus formed are filtered, washed with water and dried. Recrystallization from acetone gives about 20 mg. of 6α,16β-dichloro-17α-hydroxyprogesterone.

*Example 12.—6α-chloro-16β-iodo-17α-hydroxyprogesterone (XVIII)*

Following the procedure of Example 11 but substituting 0.1 ml. of a freshly distilled solution of 50% aqueous hydrogen iodide for the hydrogen chloride in acetic acid, there is obtained 6α-chloro-16β-iodo-17α-hydroxyprogesterone.

*Example 13.—6α,16β-dichloro-Δ¹,⁴-pregnadiene-17α-ol-3,20-dione (XIX)*

Following the procedure of Example 11 but substituting 100 mg. of 6β-chloro-16α,17α-epoxy-Δ¹,⁴-pregnadiene-3,20-dione for the 6β-chloro-16α,17α-epoxyprogesterone, 6α,16β - dichloro - Δ¹,⁴-pregnadiene-17α-ol-3,20-dione is obtained.

The following five examples illustrate an alternative method for preparing the 6α-fluoro compounds of this invention:

*Example 14.—5α-bromo-6β-fluoro-16α,17α-epoxypregnane-3β-ol-20-one (X)*

To a solution of 5.0 g. of 16α,17α-epoxy-Δ⁵-pregnene-3β-ol-20-one (IX) in a mixture of 175 ml. of chloroform and 10.0 ml. of dry tetrahydrofuran contained in a polyethylene bottle and cooled to —80°, is added 8.0 ml. (788 mmols.) of hydrogen fluoride with stirring followed by the gradual addition of 2.25 g. of N-bromoacetamide. After one hour at —80°, during which time the solution turns cherry red, the reaction is brought up to —10° and left at this temperature for three hours. The reaction mixture is then poured into a mixture of chloroform (300 ml.) and ice-water (300 ml.) contained in a polyethylene beaker and neutralized with sodium bicarbonate. The chloroform is separated, washed with water and evaporated to dryness. Crystallization of the residue from acetone-hexane gives about 3.5 g. of 5α-bromo-6β-fluoro-16α,17α-epoxypregnane-3β-ol-20-one of the following properties: M.P. about 195–197°;

$[\alpha]_D^{23} -29.4°$ (chloroform); $\lambda_{max}^{alc}$ none; $\lambda_{max}^{Nujol}$ 2.84, 5.95μ

Analysis.—Cald. for $C_{21}H_{30}O_3BrF$: C, 58.74; H, 7.04; Br, 18.61; F, 4.42. Found: C, 58.33; H, 6.79; Br, 18.82; F, 4.65.

Similarly, by substituting 2.25 g. of N-chlorosuccinimide for the N-bromoacetamide in Example 14, 5α-chloro-6β-fluoro-16α,17α-epoxypregnane-3β-ol-20-one is obtained. Moreover, substitution of an equivalent amount of N-iodosuccinimide yields 5α-iodo-6β-fluoro-17α,17α-epoxypregnane-3β-ol-20-one.

*Example 15.—5α-bromo-6β-fluoro-16α,17α-epoxypregnane-3,20-dione (XI)*

To a solution of 2.0 g. of 5α-bromo-6β-fluoro-16α,17α-epoxypregnane-3β-ol-20-one in 22 ml. of acetone is added dropwise with stirring 1.54 ml. of a solution of chromic anhydride (200 mg./ml.) and sulfuric acid (320 mg./ml.) in water. The excess oxidizing agent is destroyed with a few drops of methanol and the mixture filtered and washed well with acetone. Slow addition of water with swirling to the filtrate yields crystals which are filtered, washed well with water and dried to give about 1.75 g. of 5α-bromo-6β-fluoro-16α,17α-epoxypregnane-3,20-dione of the following properties: M.P. about 95–105°;

$\lambda_{max.}^{alc.}$ none; $\lambda_{max.}^{Nujol}$ 5.87, 5.91 mμ

Analysis.—Calcd. for $C_{21}H_{28}O_3BrF$ (427.53): C, 59.02; H, 6.60; Br, 18.70; F, 4.44. Found: C, 59.01; H, 6.76; Br, 18.99; F, 3.99.

Similarly, 5α - iodo - 6β-fluoro-16α,17α-epoxypregnane-3β-ol-20-one and 5α-chloro-6β-fluoro-16α,17α-epoxypregnane-3β-ol-20-one are oxidized to 5α-iodo-6β-fluoro-16α,17α-epoxypregnane - 3,20 - dione and 5α-chloro-6β-fluoro-16α,17α-epoxypregnane-3,20-dione, respectively.

*Example 16.—6β-fluoro-16α,17α-epoxyprogesterone (XII)*

To a solution of 500 mg. of sodium acetate in 45 ml. of methanol is added 500 mg. of 5α-bromo-6β-fluoro-16α,17α-epoxypregnane-3,20-dione and the mixture is refluxed for 30 minutes. The solution is then cooled, neutralized with dilute acetic acid and diluted with water whereupon crystalline needles separate. These are filtered, washed with water and dried to give about 300 mg. of 6β-fluoro-16α,17α-epoxyprogesterone, M.P. about 205–206°;

$[\alpha]_D^{23} + 54°$ (chloroform); $\lambda_{max.}^{alc.}$ 234 mμ ($\epsilon = 9{,}600$); $\lambda_{max.}^{Nujol}$ 5.85, 5.95, 6.17μ

Analysis.—Calcd. for $C_{21}H_{27}O_3F$: C, 72.80; H, 7.86; F, 5.48. Found: C, 73.05; H, 7.89; F, 5.79.

Similarly, by substituting 5α - iodo - 6β-fluoro-16α,17α-epoxypregnane - 3,20 - dione and 5α-chloro-6β-fluoro-16α,17α - epoxypregnane - 3,20 - dione for the 5α-bromo-6β-fluoro-16α,17α-epoxypregnane-3,20-dione in the procedure of Example 16, 6β-fluoro-16α,17α-epoxyprogesterone is likewise formed.

*Example 17.—6β-fluoro-16α,17α-epoxy-Δ¹,⁴-pregnadiene-3,20-dione (XIII)*

6β-fluoro-16α,17α-epoxyprogesterone is dehydrogenated in the 1,2-position to 6β-fluoro-16α,17α-epoxy-Δ¹,⁴-pregnadiene-3,20-dione by means of *Bacterium cyclo-oxydans* A.T.C.C. No. 12,673 using the method of Example 1 of U.S. Patent No. 2,822,318 and substituting 500 mg. of 6β - fluoro - 16α,17α - epoxyprogesterone for the 11α - hydroxyprogesterone of the example.

*Example 18.—6α-fluoro-16β-bromo-17α-hydroxyprogesterone (XIV)*

To a suspension of 1.0 g. of 6β-fluoro-16α,17α-epoxyprogesterone in 10 ml. of acetic acid, 1.0 ml. of 33% hydrogen bromide in acetic acid is added and the mixture stirred at room temperature for 30 minutes during which time the compound dissolves. The solution is diluted with water, the resulting crystals filtered, washed with water and then dried. Recrystallization from acetone-hexane gives about 900 mg. of 6α-fluoro-16β-bromo-17α-hydroxyprogesterone: M.P. about 194–195°;

$[\alpha]_D^{20} + 59°$ (chloroform); $\lambda_{max.}^{alc.}$ 235 mμ ($\epsilon = 16{,}800$); $\lambda_{max.}^{Nujol}$ 3.00, 5.86, 6.02, 6.18μ

Analysis.—Calcd. for $C_{21}H_{28}O_3BrF$ (427.35): C, 59.01; H, 6.60; Br, 18.70; F, 4.44. Found: C, 59.14; H, 6.73; Br, 18.72; F, 4.84.

Similarly by substituting an equivalent amount of hydrogen chloride and hydrogen iodide for the hydrogen bromide in the procedure of Example 18, 6α-fluoro-16β-chloro-17α-hydroxyprogesterone and 6α-fluoro-16β-iodo-17α-hydroxyprogesterone are formed, respectively.

*Example 19.—6α-fluoro-16β-bromo-Δ¹,⁴-pregnadiene-17α-ol-3,20-dione (XX)*

Following the procedure of Example 18, but substituting 1.0 g. of 6β-fluoro-16α,17α-epoxy-Δ¹,⁴-pregnadiene-3,20-dione for the 6β-fluoro-16α,17α-epoxyprogesterone, 6α-fluoro-16β-bromo-Δ¹,⁴-pregnadiene - 17α-ol-3,20-dione is obtained.

*Example 20.—6α-fluoro-16β-bromo-17α-acetoxyprogesterone (XXI)*

To a stirred suspension of 200 mg. of 6α-fluoro-16β-bromo-17α-hydroxyprogesterone in 5.0 ml. of acetic anhydride, 0.1 ml. of a solution of 0.1 ml. of 70% perchloric acid in 10 ml. of acetic anhydride is added. The mixture is stirred for 30 minutes during which time the steroid dissolves and the solution darkens. It is then poured onto ice and stirred vigorously until the acetic anhydride is hydrolyzed, and the oil which first separates becomes crystalline. The crystals are filtered, washed with water, dried and then recrystallized from acetone-hexane to give about 150 mg. of 6α-fluoro-16β-bromo-17α-acetoxyprogesterone; M.P. about 144–146°;

$[\alpha]_D^{23} + 70.6$ (chloroform); $\lambda_{max.}^{alc.}$ 236 mμ ($\epsilon = 14{,}300$); $\lambda_{max.}^{Nujol}$ 5.82, 5.92, 6.03, 6.20μ

Analysis.—Calcd. for $C_{23}H_{30}O_4BrF$: C, 58.85; H, 6.44; Br, 17.03; F, 4.05. Found: C, 59.26; H, 6.67; Br, 17.06; F, 3.83.

Similarly, by substituting an equivalent amount of 6α-chloro - 16β - bromo-17α-hydroxyprogesterone, 6α-fluoro-16β - chloro-17α-hydroxyprogesterone, 6α,16β - dichloro-Δ¹,⁴-pregnadiene - 17α - ol - 3,20-dione and 6α-fluoro-16β-bromo-Δ¹,⁴-pregnadiene - 17α - ol - 3,20-dione for the 6α-fluoro - 16β - bromo - 17α - hydroxyprogesterone in the procedure of Example 20, 6α-chloro-16β-bromo-17α-acetoxyprogesterone (XXII), 6α - fluoro-16β-chloro-17α-acetoxyprogesterone (XXIII), 6α,16β-dichloro-17α-acetoxy-Δ¹,⁴ - pregnadiene-3,20-dione (XXVI) and 6α-fluoro-16β-bromo - 17α - acetoxy - Δ¹,⁴ - pregnadiene - 3,20 - dione (XXVII) are formed, respectively.

*Example 21.—6α,16β-dichloro-17α-propionyloxyprogesterone (XXIV)*

To a stirred suspension of 200 mg. of 6α,16β-dichloro-17α-hydroxyprogesterone in 5.0 ml. of propionic anhydride, 0.1 ml. of a solution of 0.1 ml. of 70% perchloric acid in 10 ml. of propionic anhydride is added. The mixture is stirred for 30 minutes, during which time the steroid dissolves and the solution darkens. It is then poured onto ice and stirred vigorously until the propionic anhydride is hydrolyzed and the oil which first separates becomes crystalline. The crystals are filtered, washed with water, dried and then recrystallized from acetone-hexane to give 6α,16β-dichloro-17α-propionyloxyprogesterone.

*Example 22.—6α-chloro-16β-iodo-17α-heptanoyloxyprogesterone (XXV)*

To a stirred suspension of 200 mg. of 6α-chloro-16β-iodo-17α-hydroxyprogesterone in 3 ml. of heptanoic anhydride, 0.1 ml. of a solution of 0.1 ml. of 70% perchloric acid in 10 ml. of heptanoic anhydride is added. The mixture is stirred for 30 minutes during which time the steroid dissolves and the solution darkens. It is then poured onto ice and stirred vigorously until the heptanoic anhydride is hydrolyzed and the oil which first separates becomes crystalline. The crystals are filtered, washed with water, dried and then recrystallized from acetone-hexane to give 6α-chloro-16β-iodo-17α-heptanoyloxyprogesterone.

*Example 23.—6α-fluoro-16α,17α-dihydroxyprogesterone 16α-acetate (XXVIII)*

A solution of 122 mg. of 6α-fluoro-16β-bromo-17α-acetoxyprogesterone and 250 mg. of anhydrous sodium acetate in 4 ml. of acetic acid is refluxed for one hour.

The resulting mixture is then cooled, diluted with water, separated from a small amount of tarry material by filtration and extracted with chloroform (2× 20 ml.). The combined chloroform extracts are washed with water and evaporated to dryness to yield 6α-fluoro-16α,17α-dihydroxyprogesterone 16α-acetate.

Similarly, 6α-chloro-16β-bromo-17α-acetoxyprogesterone, 6α,16β-dichloro-17α-propionyloxyprogesterone, 6α-chloro-16β-iodo-17α - heptanoyloxyprogesterone, 6α,16β-dichloro-17α-acetoxy-Δ¹,⁴-pregnadiene-3,20-dione and 6α-fluoro-16β-bromo-17α-acetoxyΔ¹,⁴-pregnadiene - 3,20 - dione yield 6α-chloro-16α,17α-dihydroxyprogesterone 16α-acetate (XXIX), 6α-chloro-16α,17α-dihydroxyprogesterone 16α-propionate (XXX), 6α-chloro-16α,17α-dihydroxyprogesterone 16α-heptanoate (XXXI), 6α-chloro-16α-acetoxy-Δ¹,⁴-pregnadiene-17α-ol-3,20-dione (XXXII), and 6α-fluoro-16α-acetoxy-Δ¹,⁴-pregnadiene-17α-ol-3,20 - dione (XXXIII), respectively.

*Example 24.—6α-fluoro-16α,17α-dihydroxyprogesterone (XXXIV)*

To a solution of 100 mg. of 6α-fluoro-16α,17α-dihydroxyprogesterone 16α-acetate in 4.5 ml. of methanol is added under a blanket of nitrogen 0.45 ml. of 10% potassium carbonate. After 45 minutes at room temperature, the solution is neutralized with 10% acetic acid and diluted with water whereupon long needles separate. These are filtered off, washed with water, dried and recrystallized from methanol to give about 34 mg. of 6α-fluoro-16α,17α-dihydroxyprogesterone: M.P. about 213–214°;

$[\alpha]_D$ +81.5° (chloroform); $\lambda^{alc}_{max.}$ 236 mμ ($\epsilon$=16,100);

$\lambda^{Nujol}_{max.}$ 2.80, 2.90, 3.00–3.10, 5.90, 6.02μ

*Analysis.*—Calcd. for $C_{21}H_{29}O_4F$ (364.44): C, 69.21; H, 8.02; F, 5.20. Found: C, 69.19; H, 8.10; F, 5.02.

Similarly, by substituting an equivalent amount of 6α-chloro - 16α,17α - dihydroxyprogesterone 16α-acetate, 6α-chloro-Δ¹,⁴-pregnadiene-16α,17α-diol-3,20-dione 16α-acetate and 6α-fluoro-Δ¹,⁴-pregnadiene-16α,17α-diol-3,20-dione 16α-acetate for the 6α-fluoro-16α,17α-dihydroxyprogesterone-16α-acetate in the procedure of Example 24, 6α-chloro-16α,17α-dihydroxyprogesterone (XXXV), 6α-chloro-Δ¹,⁴-pregnadiene-16α,17α-diol-3,20 - dione (XXXVI), and 6α-fluoro-Δ¹,⁴-pregnadiene-16α,17α-diol - 3,20 - dione (XXXVII) are obtained, respectively.

*Example 25.—6α-fluoro-16α,17α-dihydroxyprogesterone 16,17-acetonide (XXXVIII)*

To a solution of 0.01 ml. of 70% perchloric acid in 2.0 ml. of acetone is added 17.5 mg. of 6α-fluoro-16α,17α-dihydroxyprogresterone and the solution is stirred at room temperature for one hour. The solution is then neutralized with dilute sodium bicarbonate and on dilution with water the crystalline 6α-fluoro-16α,17α-dihydroxyprogesterone 16,17-acetonide separates as long needles. These are filtered, washed with water and dried to give about 13.8 mg. of product: M.P. about 252–253°;

$\lambda^{Nujol}_{max.}$ 5.91, 6.00, 6.20μ

Similarly, by substituting an equivalent amount of 6α-chloro-16α,17α-dihydroxyprogesterone, 6α - chloro - Δ¹,⁴-pregnadiene-16α,17α-diol-3,20-dione and 6α - fluoro-Δ¹,⁴-pregnadiene-16α,17α-diol-3,20-dione for the 6α-fluoro-16α,17α-dihydroxyprogesterone in the procedure of Example 25, 6α-chloro-16α,17α - dihydroxyprogesterone 16,17-acetonide (XXXIX), 6α-chloro-Δ¹,⁴-pregnadiene - 16α,17α-diol-3,20-dione 16,17-acetonide (XL), and 6α-fluoro-Δ¹,⁴-pregnadiene-16α,17α - diol-3,20-dione 16,17 - acetonide (XLI) are formed respectively.

The invention may be variously otherwise embodied within the scope of the appended claims.

What is claimed is:

1. 5α,6α; 16α,17α-diepoxypregnane-3,20-dione 3,20-bis-(lower alkylene) ketal.

2. 6β-halo-16α,17α-epoxypregnane-5α-ol-3,20-dione 3,20-bis-(lower alkylene) ketal, wherein the halogen has an atomic number less than eighteen.

3. 5α-halo-6β-fluoro-16α,17α-epoxypregnane-3β - ol-20-one, wherein the halogen has an atomic number greater than ten.

4. A process for preparing a steroid of the general formula

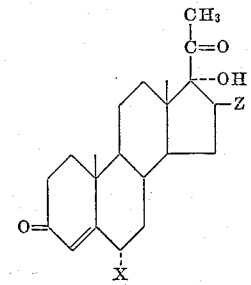

wherein Z is selected from the group consisting of iodo, bromo and chloro and X is selected from the group consisting of chloro and fluoro, which comprises interacting 6β-X-16α,17α-epoxypregnane-5α-ol-3,20 - dione 3,20-bis-(lower alkylene) ketal with a hydrogen halide of the formula HZ, wherein X and Z are as defined.

5. A process for preparing 5α-W-6β-fluoro-16α,17α-epoxypregnane-3β-ol-20-one, wherein W is a halogen of atomic number greater than ten, which comprises interacting 16α,17α-epoxy-Δ⁵-pregnene-3β-ol-20-one with an N-W-amide, wherein W is as defined and hydrogen fluoride.

References Cited

UNITED STATES PATENTS

| | | | |
|---|---|---|---|
| 2,686,181 | 8/1954 | Julian et al. | 260—239.55 |
| 2,816,108 | 12/1957 | Julian et al. | 260—397.47 |
| 2,838,528 | 6/1958 | Campbell et al. | 260—397.3 |
| 2,933,492 | 4/1960 | Poos et al. | 260—239.55 |
| 2,925,415 | 2/1960 | Loken | 260—239.55 |
| 2,837,464 | 6/1958 | Nobile | 195—51 |
| 3,067,213 | 12/1962 | Ringold et al. | 260—397.4 |

OTHER REFERENCES

Fieser et al.: Steroids (1959) pp. 202, 288 and 325.

ELBERT L. ROBERTS, *Primary Examiner.*

L. H. GASTON, M. LIEBMAN, L. GOTTS, *Examiners.*

M. L. WILLIAMS, G. E. LANDE, *Assistant Examiners.*